(12) United States Patent
Yoshimaru et al.

(10) Patent No.: US 10,566,594 B2
(45) Date of Patent: Feb. 18, 2020

(54) NONAQUEOUS ELECTROLYTE SECONDARY BATTERY SEPARATOR

(71) Applicant: Sumitomo Chemical Company, Limited, Tokyo (JP)

(72) Inventors: Chikae Yoshimaru, Osaka (JP); Syusaku Hara, Niihama (JP); Daizaburo Yashiki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/910,354

(22) Filed: Mar. 2, 2018

(65) Prior Publication Data
US 2018/0254455 A1 Sep. 6, 2018

(30) Foreign Application Priority Data

Mar. 3, 2017 (JP) .................. 2017-041085

(51) Int. Cl.
*H01M 2/16* (2006.01)
*H01M 2/14* (2006.01)
*H01M 10/0525* (2010.01)

(52) U.S. Cl.
CPC ......... *H01M 2/1653* (2013.01); *H01M 2/145* (2013.01); *H01M 2/1686* (2013.01); *H01M 10/0525* (2013.01)

(58) Field of Classification Search
CPC .......... H01M 2/14; H01M 2/145; H01M 2/16; H01M 2/1606; H01M 2/1613;
(Continued)

(56) References Cited

U.S. PATENT DOCUMENTS 9,508,975 B1 11/2016 Matsuo
2002/0189898 A1* 12/2002 Campbell ................. E04G 5/00
182/3
(Continued)

FOREIGN PATENT DOCUMENTS

CN 101048892 A 10/2007
CN 101420018 4/2009
(Continued)

OTHER PUBLICATIONS

Office Action dated Jul. 30, 2018 in KR Application No. 10-2018-0025175.
(Continued)

*Primary Examiner* — Imran Akram
(74) *Attorney, Agent, or Firm* — Panitch Schwarze Belisario & Nadel LLP (57) ABSTRACT

The present invention provides a nonaqueous electrolyte secondary battery separator which is excellent in cycle characteristic. The nonaqueous electrolyte secondary battery separator includes a polyolefin porous film in which a difference between (i) a porosity calculated from a continuous image which is formed so as to extend from a surface to an inside of the polyolefin porous film in a thickness direction and in which a void part and a resin part are shown at respective two gray levels and (ii) a porosity calculated from a thickness, a weight per unit area, and a real density of the polyolefin porous film is 4% to 20%.

4 Claims, 2 Drawing Sheets

US 10,566,594 B2

Page 2

(58) Field of Classification Search
CPC .. H01M 2/162; H01M 2/1626; H01M 2/1633;
H01M 2/164; H01M 2/1646; H01M
2/1653; H01M 2/166; H01M 2/1666;
H01M 2/1673; H01M 2/168; H01M
2/1686; H01M 2/1693; B32B 27/32;
B32B 27/322; B32B 27/325; B32B
27/327
See application file for complete search history.

(56) References Cited

U.S. PATENT DOCUMENTS

| | | |
|---|---|---|
| 2007/0264577 A1 | 11/2007 | Katayama et al. |
| 2009/0067119 A1 | 3/2009 | Katayama et al. |
| 2009/0148685 A1 | 6/2009 | Kang et al. |
| 2009/0219672 A1* | 9/2009 | Masuda .................. H01G 9/02 361/502 |
| 2010/0173187 A1* | 7/2010 | Nishikawa ............ H01M 2/145 429/129 |
| 2011/0135991 A1 | 6/2011 | Sato |
| 2011/0143185 A1* | 6/2011 | Nishikawa ............ H01M 2/162 429/145 |
| 2011/0269010 A1 | 11/2011 | Sawaguchi et al. |
| 2012/0028101 A1 | 2/2012 | Ishihara et al. |
| 2012/0028102 A1 | 2/2012 | Ishihara et al. |
| 2012/0028131 A1 | 2/2012 | Ishihara et al. |
| 2012/0034518 A1 | 2/2012 | Ishihara et al. |
| 2012/0034519 A1 | 2/2012 | Ishihara et al. |
| 2012/0040232 A1 | 2/2012 | Ishihara et al. |
| 2012/0115008 A1 | 5/2012 | Sano et al. |
| 2012/0189897 A1* | 7/2012 | Wakizaka ............. H01M 2/145 429/144 |
| 2012/0202102 A1 | 8/2012 | Kakibe et al. |
| 2012/0268072 A1 | 10/2012 | Okuno |
| 2012/0329894 A1 | 12/2012 | Yamamoto et al. |
| 2013/0017432 A1 | 1/2013 | Roumi |
| 2013/0034769 A1 | 2/2013 | Takagi et al. |
| 2013/0130123 A1* | 5/2013 | Kaneda .................. H01M 2/16 429/233 |
| 2013/0224632 A1 | 8/2013 | Roumi |
| 2013/0266873 A1* | 10/2013 | Ishii ................... H01M 2/1653 429/246 |
| 2013/0288103 A1* | 10/2013 | Mizuno ................ H01M 2/145 429/145 |
| 2013/0288132 A1 | 10/2013 | Terakawa et al. |
| 2014/0017549 A1 | 1/2014 | Miyazaki et al. |
| 2014/0217013 A1 | 8/2014 | Sato |
| 2014/0315065 A1* | 10/2014 | Mizuno .............. H01M 2/1686 429/145 |
| 2015/0099161 A1 | 4/2015 | Hitotsuyanagi et al. |
| 2015/0372278 A1 | 12/2015 | Kakibe et al. |
| 2016/0013461 A1* | 1/2016 | Mizuno ...................... C08J 5/18 429/143 |
| 2016/0240830 A1* | 8/2016 | Mizuno ................... B32B 27/32 |
| 2016/0254514 A1 | 9/2016 | Roumi |
| 2016/0268570 A1 | 9/2016 | Wang et al. |
| 2016/0268572 A1 | 9/2016 | Sato |
| 2016/0365559 A1 | 12/2016 | Yoshimaru et al. |
| 2017/0033347 A1 | 2/2017 | Murakami et al. |
| 2017/0033348 A1 | 2/2017 | Murakami et al. |
| 2017/0133649 A1 | 5/2017 | Sawaguchi et al. |
| 2017/0141373 A1 | 5/2017 | Murakami et al. |
| 2017/0155106 A1 | 6/2017 | Arise et al. |
| 2017/0155116 A1 | 6/2017 | Kobayashi |
| 2017/0155122 A1 | 6/2017 | Yoneyama |
| 2017/0155123 A1* | 6/2017 | Hasegawa ................ B32B 7/04 |
| 2017/0162849 A1 | 6/2017 | Murakami et al. |
| 2017/0162850 A1 | 6/2017 | Murakami et al. |
| 2017/0170443 A1 | 6/2017 | Murakami et al. |
| 2017/0187023 A1 | 6/2017 | Sakamoto et al. |
| 2017/0244086 A1 | 8/2017 | Umeyama et al. |
| 2017/0263905 A1 | 9/2017 | Ogata et al. |
| 2017/0341035 A1 | 11/2017 | Sato et al. |
| 2018/0233730 A1 | 8/2018 | Ohya et al. |

FOREIGN PATENT DOCUMENTS

| | | |
|---|---|---|
| CN | 101702428 A | 5/2010 |
| CN | 102082249 A | 6/2011 |
| CN | 102088109 A | 6/2011 |
| CN | 102339965 A | 2/2012 |
| CN | 102468466 A | 5/2012 |
| CN | 102781667 A | 11/2012 |
| CN | 102782027 A | 11/2012 |
| CN | 103545546 A | 1/2014 |
| CN | 103781832 | 5/2014 |
| CN | 103972444 | 8/2014 |
| CN | 105593280 A | 5/2016 |
| CN | 105706270 A | 6/2016 |
| CN | 106410096 | 2/2017 |
| CN | 106410099 A | 2/2017 |
| EP | 3239222 A1 | 11/2017 |
| JP | H11130900 A | 5/1999 |
| JP | 2003103626 A | 4/2003 |
| JP | 2007045547 A | 2/2007 |
| JP | 2007103040 A | 4/2007 |
| JP | 2007265824 A | 10/2007 |
| JP | 2007320145 A | 12/2007 |
| JP | 2009123483 A | 6/2009 |
| JP | 2009123484 A | 6/2009 |
| JP | 2011028883 A | 2/2011 |
| JP | 2011210437 A | 10/2011 |
| JP | 2012059416 A | 3/2012 |
| JP | 2012069267 A | 4/2012 |
| JP | 2012227066 A | 11/2012 |
| JP | 2013171679 A | 9/2013 |
| JP | 2013219053 A | 10/2013 |
| JP | 2014167918 A | 9/2014 |
| JP | 2014186857 A | 10/2014 |
| JP | 2014226841 A | 12/2014 |
| JP | 2015021827 A | 2/2015 |
| JP | 2015072899 A | 4/2015 |
| JP | 2015092474 A | 5/2015 |
| JP | 2015519686 A | 7/2015 |
| JP | 2016081763 A | 5/2016 |
| JP | 2016154151 A | 8/2016 |
| JP | 2017027945 A | 2/2017 |
| JP | 2017045547 A | 3/2017 |
| KR | 20120003864 A | 1/2012 |
| KR | 20120030966 A | 3/2012 |
| KR | 20160077118 A | 7/2016 |
| KR | 20160088434 A | 7/2016 |
| KR | 20160094846 A | 8/2016 |
| KR | 101683424 B1 | 12/2016 |
| KR | 101700067 B1 | 1/2017 |
| KR | 101707380 B1 | 2/2017 |
| KR | 20170014223 A | 2/2017 |
| KR | 20170016881 A | 2/2017 |
| WO | 2011118660 A1 | 9/2011 |
| WO | 2012102241 A1 | 8/2012 |
| WO | 2015194504 A1 | 12/2015 |
| WO | 2016104789 A1 | 6/2016 |

OTHER PUBLICATIONS

Office Action dated Mar. 21, 2018 in KR Application No. 10-2018-0025175.
Office Action dated Dec. 24, 2018 in CN 201810175532.7 (English Translation).
Office Action dated Feb. 3, 2019 in CN Application No. 201810175781.6.
Office Action dated Nov. 27, 2018 in JP Application No. 2017041082 (Partial Translation).
Office Action dated Mar. 21, 2018 in KR Applcation No. 10-2018-0025109.
Office Action dated Jun. 11, 2019 in U.S. Appl. No. 15/910,215, by Yoshimaru.
Office Action dated Mar. 26, 2019 in JP Application No. 2017-041086 (Partial English Translation).
Office Action dated Jan. 25, 2019 in CN Application No. 201810177305.8.
Office Action dated Jul. 16, 2018 in KR Application No. 10-2018-0025176.

(56) References Cited

OTHER PUBLICATIONS

Office Action dated Mar. 21, 2018 in KR Application No. 10-2018-0025176.
Office Action dated Jan. 30, 2019 in U.S. Appl. No. 15/910,222, by Yoshimaru.
Office Action dated May 10, 2019 in U.S. Appl. No. 15/910,222, by Yoshimaru.
Office Action dated Mar. 27, 2018 in KR Application No. 10-2018-0025254.
Office action dated Feb. 15, 2019 in U.S. Appl. No. 15/910,548, by Arise.
Office Action dated Jan. 23, 2019 in CN Application No. 201810175526.1.
Office Action dated Feb. 3, 2019 in CN Application 201810175524.2.
Office Action dated Mar. 27, 2018 in KR Application No. 10-2018-0025248.
Office Action dated Jan. 22, 2019 in U.S. Appl. No. 15/910,658, by Arise.
Office Action dated Feb. 3, 2019 in CN Application No. 201810175515.3.
Office Action dated Mar. 27, 2018 in KR Application No. 10-2018-0025182.
Office Action dated Jun. 6, 2019 in U.S. Appl. No. 15/910,096, by Arise.
Office Action dated Mar. 4, 2019 in U.S. Appl. No. 15/910,096, by Arise.
Office Action dated Mar. 21, 2018 in KR Application No. 10-2018-0025109.
Office Action dated Jul. 16, 2018 in KR Application No. 2018-0025109.
Office Action dated Dec. 4, 2018 in JP Application No. 2017041086 (Partial Translation).
Office Action dated Jul. 1, 2019 in CN Application No. 201810175515.3.
Office Action dated Jul. 9, 2019 in JP Application No. 2017041086.
Office Action dated Jul. 22, 2019 in CN Application No. 201810177305.8.
Office Action dated Aug. 30, 2019 in U.S. Appl. No. 15/910,096, by Arise.
English Translation of Office Action dated Mar. 21, 2018 in KR Application No. 10-2018-0025176.
Office Action dated Mar. 5, 2019 in U.S. Appl. No. 15/910,215, by Yoshimaru.
Office Action dated May 21, 2019 in U.S. Appl. No. 15/910,658, by Arise.
Office Action dated Jun. 6, 2019 in U.S. Appl. No. 15/910,548, by Arise.
Office Action dated Dec. 24, 2018 in CN Application No. 201810175532.7.
Office Action dated Aug. 22, 2019 in U.S. Appl. No. 15/910,548, by Arise.
Office Action dated Aug. 22, 2019 in U.S. Appl. No. 15/910,658, by Arise.
Office Action dated Sep. 27, 2019 in U.S. Appl. No. 15/910,215, by Yoshimaru.
Office Action dated Oct. 25, 2019 in U.S. Appl. No. 15/910,222, by Yoshimaru.
Office Action dated Nov. 22, 2019 in CN Application No. 201810175524.2.

* cited by examiner

NONAQUEOUS ELECTROLYTE SECONDARY BATTERY SEPARATOR

This Nonprovisional application claims priority under 35 U.S.C. § 119 on Patent Application No. 2017-041085 filed in Japan on Mar. 3, 2017, the entire contents of which are hereby incorporated by reference.

TECHNICAL FIELD

The present invention relates to (i) a separator for a nonaqueous electrolyte secondary battery (hereinafter referred to as a "nonaqueous electrolyte secondary battery separator"), (ii) a laminated separator for a nonaqueous electrolyte secondary battery (hereinafter referred to as a "nonaqueous electrolyte secondary battery laminated separator"), (iii) a member for a nonaqueous electrolyte secondary battery (hereinafter referred to as a "nonaqueous electrolyte secondary battery member"), and (iv) a nonaqueous electrolyte secondary battery.

BACKGROUND ART

Nonaqueous electrolyte secondary batteries such as a lithium secondary battery are currently in wide use as (i) batteries for devices such as a personal computer, a mobile telephone, and a portable information terminal or (ii) on-vehicle batteries.

As a separator for use in such a nonaqueous electrolyte secondary battery, a porous film containing polyolefin as a main component is mainly used.

For example, Patent Literature 1 discloses, as a battery separator excellent in input/output characteristics and in safety, a battery separator constituted by a porous film whose thickness and resin occupancy, which is calculated based on a cross sectional image obtained with use of a scanning electron microscope (SEM), are specified within specific ranges.

CITATION LIST

Patent Literature

[Patent Literature 1] Japanese Patent Application Publication, Tokukai, No. 2016-081763 (Publication Date: May 16, 2016)

SUMMARY OF INVENTION

Technical Problem

However, the conventional battery separator as disclosed in Patent Literature 1 has been sometimes insufficient in its battery characteristics such as a cycle characteristic.

Solution to Problem

The present invention encompasses aspects described in the following [1] to [5].
[1] A nonaqueous electrolyte secondary battery separator including a polyolefin porous film, wherein: a difference between an average porosity calculated from a continuous image of the polyolefin porous film and a porosity calculated based on a thickness, a weight per unit area, and a real density of the polyolefin porous film is 4% to 20%, the continuous image being obtained by FIB-SEM measurement with a magnification of 6500 times and image analysis, the continuous image having a size of 256 pix×256 pix along a surface of the nonaqueous electrolyte secondary battery separator where 1 pix is 19.2 nm, a thickness of the continuous image being equal to a thickness of the nonaqueous electrolyte secondary battery separator, the continuous image being formed so as to extend from the surface to an inside of the nonaqueous electrolyte secondary battery separator in a thickness direction, and, in the continuous image, a void part and a resin part of the polyolefin porous film being shown at respective two gray levels.
[2] The nonaqueous electrolyte secondary battery separator as described in [1], wherein: a compressive elastic modulus of the nonaqueous electrolyte secondary battery separator is not less than 1600 kPa.
[3] A nonaqueous electrolyte secondary battery laminated separator including: a nonaqueous electrolyte secondary battery separator as described in [1] or [2] and an insulating porous layer.
[4] A nonaqueous electrolyte secondary battery member including: a positive electrode; a nonaqueous electrolyte secondary battery separator as described in [1] or [2] or a nonaqueous electrolyte secondary battery laminated separator as described in [3]; and a negative electrode, the positive electrode, the nonaqueous electrolyte secondary battery separator or the nonaqueous electrolyte secondary battery laminated separator, and the negative electrode being disposed in this order.
[5] A nonaqueous electrolyte secondary battery including: a nonaqueous electrolyte secondary battery separator as described in [1] or [2] or a nonaqueous electrolyte secondary battery laminated separator as described in [3].

Advantageous Effects of Invention

The nonaqueous electrolyte secondary battery separator in accordance with an embodiment of the present invention brings about an effect of excellence in rate characteristic after repeating charge and discharge.

DESCRIPTION OF EMBODIMENTS

The following description will discuss an embodiment of the present invention. The present invention is, however, not limited to the embodiment below. The present invention is not limited to the arrangements described below, but may be altered in various ways by a skilled person within the scope of the claims. Any embodiment based on a proper combination of technical means disclosed in different embodiments is also encompassed in the technical scope of the present invention. Note that numerical expressions such as "A to B" herein mean "not less than A and not more than B" unless otherwise stated.

Embodiment 1: Nonaqueous Electrolyte Secondary Battery Separator

The nonaqueous electrolyte secondary battery separator in accordance with Embodiment 1 of the present invention is a nonaqueous electrolyte secondary battery separator including a polyolefin porous film, wherein: a difference between an average porosity calculated from a continuous image of the polyolefin porous film and a porosity calculated based on a thickness, a weight per unit area, and a real density of the polyolefin porous film is 4% to 20%, the continuous image being obtained by FIB-SEM measurement with a magnification of 6500 times and image analysis, the continuous image having a size of 256 pix×256 pix along a surface of the nonaqueous electrolyte secondary battery separator where 1 pix is 19.2 nm, a thickness of the continuous image being equal to a thickness of the nonaqueous electrolyte secondary battery separator, the continuous image being formed so as to extend from the surface to an inside of the nonaqueous electrolyte secondary battery separator in a thickness direction, and, in the continuous image, a void part and a resin part of the polyolefin porous film being shown at respective two gray levels.

The nonaqueous electrolyte secondary battery separator in accordance with Embodiment 1 of the present invention includes a polyolefin porous film, and is preferably constituted by a polyolefin porous film. Note, here, that the "polyolefin porous film" is a porous film which contains a polyolefin-based resin as a main component. Note that the phrase "contains a polyolefin-based resin as a main component" means that a porous film contains a polyolefin-based resin at a proportion of not less than 50% by volume, preferably not less than 90% by volume, and more preferably not less than 95% by volume, relative to the whole of materials of which the porous film is made.

The polyolefin porous film can be the nonaqueous electrolyte secondary battery separator in accordance with an embodiment of the present invention or a base material of a nonaqueous electrolyte secondary battery laminated separator in accordance with an embodiment of the present invention, which will be described later. The polyolefin porous film has therein many pores, connected to one another, so that a gas and/or a liquid can pass through the polyolefin porous film from one side to the other side.

The polyolefin-based resin more preferably contains a high molecular weight component having a weight-average molecular weight of $3 \times 10^5$ to $15 \times 10^6$. In particular, the polyolefin-based resin more preferably contains a high molecular weight component having a weight-average molecular weight of not less than 1,000,000 because the polyolefin porous film containing such a polyolefin-based resin and a nonaqueous electrolyte secondary battery laminated separator including such a polyolefin porous film each have a higher strength.

Examples of the polyolefin-based resin which the polyolefin porous film contains as a main component include, but are not particularly limited to, homopolymers (for example, polyethylene, polypropylene, and polybutene) and copolymers (for example, ethylene-propylene copolymer) both of which are thermoplastic resins and are each produced through polymerization of a monomer(s) such as ethylene, propylene, 1-butene, 4-methyl-1-pentene, and/or 1-hexene. The polyolefin porous film can include a layer containing only one of these polyolefin-based resins or a layer containing two or more of these polyolefin-based resins. Among these, polyethylene is preferable as it is capable of preventing (shutting down) a flow of an excessively large electric current at a lower temperature. A high molecular weight polyethylene containing ethylene as a main component is particularly preferable. Note that the polyolefin porous film can contain a component(s) other than polyolefin as long as such a component does not impair the function of the layer.

Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is preferable. It is more preferable that the polyethylene contain a high molecular weight component having a weight-average molecular weight of $5 \times 10^5$ to $15 \times 10^6$.

The following description will discuss methods for calculating the two types of porosity. First, in the nonaqueous electrolyte secondary battery separator in accordance with an embodiment of the present invention, the polyolefin porous film is processed with a focused ion beam (FIB) and the polyolefin porous film thus processed is imaged with use of a scanning electron microscope (SEM) with a magnification of 6500 times. By repeating the processing and imaging, a continuous image of an interior portion of the separator is obtained. Then, the continuous image thus obtained is converted into an image in which a void part and the other portion in the porous film are shown at two gray levels. Further, from the continuous image shown at the two gray levels, a continuous image is extracted which has a size of 256 pix×256 pix along a surface of the separator where 1 pix is 19.2 nm and has a thickness equal to a thickness of the separator. The continuous image is formed from the surface of the separator toward an interior portion in a thickness direction. The continuous image thus extracted is segmented into a plurality of images each of which has a thickness of 1 pix. A porosity in each of the plurality of images thus segmented is measured, and an average of those porosities is calculated. Hereinafter the average porosity calculated from the continuous image is referred to as "SEM porosity".

Meanwhile, in the nonaqueous electrolyte secondary battery separator in accordance with an embodiment of the present invention, a porosity is calculated from a thickness, a weight per unit area, and a real density of the polyolefin porous film. Hereinafter the porosity calculated from a thickness, a weight per unit area, and a real density of the polyolefin porous film is referred to as "real porosity".

In the nonaqueous electrolyte secondary battery separator in accordance with an embodiment of the present invention, a difference between the "SEM porosity" and the "real porosity" is 4% to 20%. Note that, in this specification, the difference between the "SEM porosity" and the "real porosity" is referred to as "measurement-based porosity difference".

Here, in a case where the "SEM porosity" is measured, a nanometer-order extra-fine resin part is not observed by the SEM, and therefore the extra-fine resin part is measured as a void.

Meanwhile, the "real porosity" is calculated based on a weight per unit area, a film thickness, and a real density of the polyolefin porous film, and therefore the extra-fine resin part is not measured as a void but is measured as a portion in which resin exists.

Therefore, the "measurement-based porosity difference" in the present invention represents an amount (volume ratio) of the extra-fine resin part among the whole polyolefin porous film.

A case where the "measurement-based porosity difference" is smaller means that an amount of the extra-fine resin part is smaller, the number of fine voids (holes) having complicated structures partitioned by the extra-fine resin part is smaller, and the number of big voids is larger.

Meanwhile, in a case where the "measurement-based porosity difference" is larger, the amount of the extra-fine resin part is larger, the number of fine voids having complicated structures partitioned by the extra-fine resin part is larger, and the number of big voids is smaller.

In the nonaqueous electrolyte secondary battery separator in accordance with an embodiment of the present invention, in a case where the "measurement-based porosity difference" is not less than 4%, the extra-fine resin part which contributes to strength of the separator is contained in a certain amount and the number of big voids is small in the polyolefin porous film, and this strengthens the nonaqueous electrolyte secondary battery separator. This makes it possible to prevent a void structure inside the nonaqueous electrolyte secondary battery separator from being destroyed by a mechanical stress applied to the nonaqueous electrolyte secondary battery separator during charge and discharge, and accordingly to prevent deterioration in ion permeability and electrolyte retaining property, which affect the battery performance, of the separator. It is therefore possible to inhibit a decline of battery characteristic (rate characteristic) after repeating charge and discharge. From the above viewpoint, the "measurement-based porosity difference" is preferably not less than 4.5%.

Meanwhile, in the nonaqueous electrolyte secondary battery separator in accordance with an embodiment of the present invention, a case where the "measurement-based porosity difference" is not more than 20% means that, in the polyolefin porous film, the extra-fine resin part is not excessively large in amount, and the number of fine voids is not excessively large. This makes it possible to prevent voids (especially, voids in an interface with an electrode) of the nonaqueous electrolyte secondary battery separator from being blocked (clogged) by a by-product that is derived from the nonaqueous electrolyte during charge and discharge, and accordingly to inhibit a decline in rate characteristic (cycle characteristic) when the charge-discharge cycle is repeated. From the above viewpoint, the "measurement-based porosity difference" is preferably not more than 19.0%.

Figure 1:
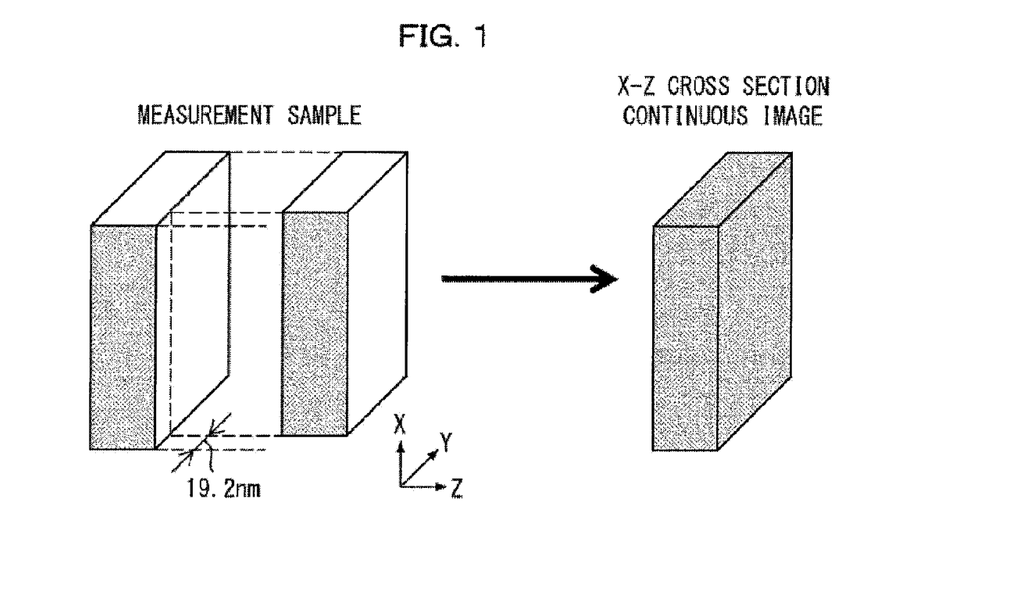
FIG. 1 is a schematic view illustrating a step of a method of calculating an SEM porosity of a nonaqueous electrolyte secondary battery separator in accordance with an embodiment of the present invention, that is, a step of obtaining an X-Z cross section continuous image from a measurement sample.
Figure 2:
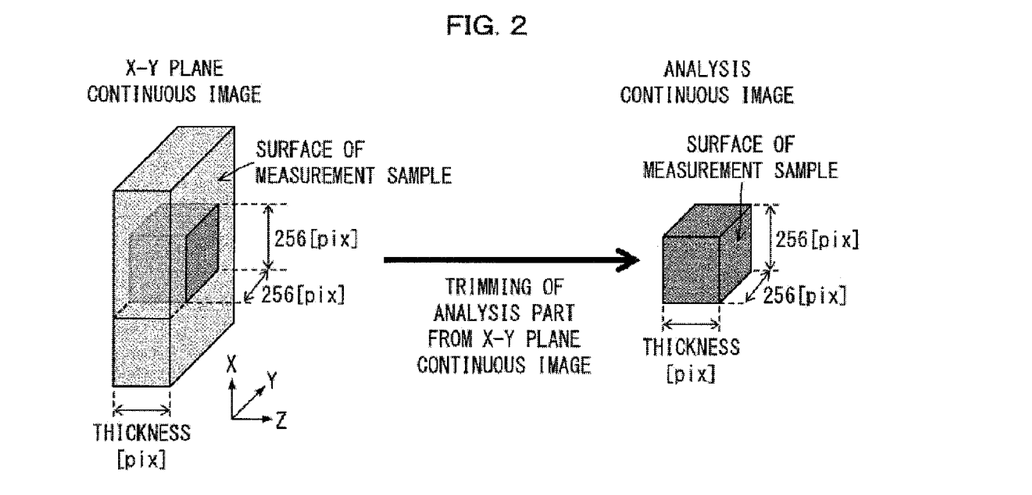
FIG. 2 is a schematic view illustrating a step of a method of calculating an SEM porosity of a nonaqueous electrolyte secondary battery separator in accordance with an embodiment of the present invention, that is, a step of obtaining an analysis continuous image from an X-Y plane continuous image shown at two gray levels.
Figure 3:
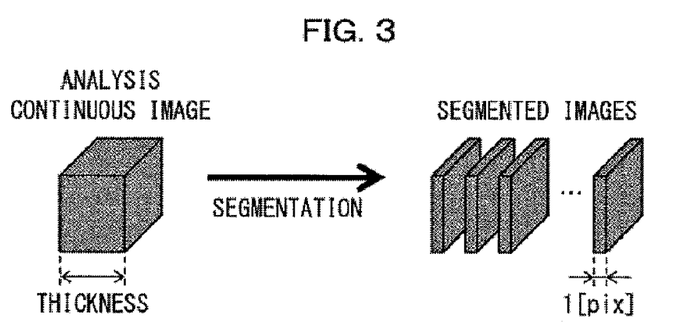
FIG. 3 is a schematic view illustrating a step of a method of calculating an SEM porosity of a nonaqueous electrolyte secondary battery separator in accordance with an embodiment of the present invention, that is, a step of segmenting an analysis continuous image into a plurality of images each having a size of 1 pix in the Z direction.

The following description will discuss a specific method of calculating the "SEM porosity" of the nonaqueous electrolyte secondary battery separator in accordance with an embodiment of the present invention (see FIGS. 1 through 3).

First, a polyolefin porous film is impregnated with an embedding resin (e.g., epoxy resin), the embedding resin fills a void part of the polyolefin porous film and then is cured, and the cured embedding resin is treated with osmium tetroxide, so that a measurement sample is produced.

As illustrated in FIG. 1, a thickness direction of the measurement sample (a direction in which a thickness of the measurement sample extends) is a Z direction, any direction that is parallel to a surface of the measurement sample which surface is orthogonal to the thickness is an X direction, and a direction that is orthogonal to each of the X direction and the Z direction is a Y direction. A cross section defined by any side X of a surface of the measurement sample and a thickness Z of the measurement sample (hereinafter referred to as an "X-Z cross section") is produced by carrying out FIB processing with respect to the measurement sample by use of an FIB-SEM (HELIOS600 manufactured by FEI). The cross section is subjected to SEM observation (in which a reflection electron image is shown) at an acceleration voltage of 2.1 kV and a magnification of 6500 times, so that an SEM image is obtained.

After the SEM observation, FIB processing is carried out with respect to the measurement sample by a thickness of 19.2 nm in the Y direction, which is orthogonal to the X-Z cross section, so that a new X-Z cross section is produced. The new X-Z cross section is subjected to the SEM observation (in which a reflection electron image is shown) under the above conditions, so that an SEM image is obtained. Thereafter, FIB processing and SEM image obtainment are similarly repeated at intervals of a thickness of 19.2 nm, so that an X-Z cross section continuous image of the measurement sample is obtained.

That is, as illustrated in FIG. 1, in a case where X-Z cross sections are repeatedly produced by carrying out FIB processing with respect to the measurement sample at intervals of 19.2 nm along a Y-axis of the measurement sample and each of the X-Z cross sections thus produced is subjected to SEM observation, a continuous X-Z cross section image (X-Z cross section continuous image) of the measurement sample is obtained.

Subsequently, the X-Z cross section continuous image is positionally corrected by use of image analysis software (Avizo Ver. 6.0 manufactured by Visualization Sciences Group), and the X-Z cross section continuous image thus corrected is obtained on a scale of 19.2 nm/pix in X, Y, and Z-axes.

Quantitative analysis software (TRI/3D-BON-FCS manufactured by Ratoc System Engineering Co., Ltd.) is used to show the X-Z cross section continuous image, which has been positionally corrected, at two gray levels so that a resin part and a void part of the polyolefin porous film can be distinguished. From this, a part (hereinafter referred to as a "resin part") made of a resin constituting the polyolefin porous film in the measurement sample is distinguished from the embedding resin part. That is, a polyolefin porous film part (resin part) and the void part in the polyolefin porous film are distinguished.

Subsequently, an X-Z plane of the X-Z cross section continuous image in which the resin part and the embedding resin part are shown at respective two gray levels is transformed to an X-Y plane by use of SectionView in an EditViewer mode on the TRI/3D-BON-FCS. This allows the X-Z cross section continuous image to be transformed, on a scale of 19.2 nm/pix in the X, Y, and Z-axes, to a surface direction continuous image (hereinafter referred to as an "X-Y plane continuous image") of the measurement sample which surface direction continuous image is formed so as to extend from a surface to an inside of the measurement sample in a thickness direction of the measurement sample, and which surface direction continuous image is shown at two gray levels.

Thereafter, any part whose number of pixels is 256 pix in the X direction, is 256 pix in the Y direction, and corresponds to a thickness of the measurement sample in the Z direction is trimmed from the X-Y plane continuous image, so that an analysis continuous image is obtained.

That is, as illustrated in FIG. 2, a portion to be analyzed is trimmed from the X-Z cross section continuous image shown at two gray levels, and thus the analysis continuous image is extracted.

After that, as illustrated in FIG. 3, the analysis continuous image is segmented into a plurality of images each of which has a size of 1 pix in the Z direction. For each of the plurality of images thus segmented, a ratio of the void part (porosity) with respect to an analysis region is measured with use of a 2D label density function. An average porosity (i.e., a porosity of the measurement sample) is calculated from the measured porosities of the respective plurality of images. The porosity of the measurement sample thus calculated is regarded as an "SEM porosity" of the polyolefin porous film.

The following description will discuss a specific method of calculating the "real porosity" of the nonaqueous electrolyte secondary battery separator in accordance with an embodiment of the present invention. The "real porosity" is calculated based on the following Formula (1) with use of a film thickness [μm], a weight per unit area [g/m$^2$], and a real density [g/m$^3$] of the nonaqueous electrolyte secondary battery separator.

$$(\text{Real porosity})=[1-(\text{weight per unit area})/\{(\text{film thickness})\times 10^{-6}\times 1 \text{ [m}^2\text{]}\times(\text{real density})\}]\times 100 \quad (1)$$

Here, methods for measuring the film thickness, the weight per unit area, and the real density of the polyolefin porous film are not particularly limited, and it is possible to use methods that can be generally used in the field to which the present invention pertains.

A difference between the "SEM porosity" and the "real porosity", which have been measured with the above described methods, is calculated, and a value thus calculated is regarded as a "measurement-based porosity difference".

In the nonaqueous electrolyte secondary battery separator in accordance with an embodiment of the present invention, in view of inhibiting a decline in rate characteristic after repeating charge and discharge, a compressive elastic modulus is preferably not less than 1600 kPa, more preferably not less than 2000 kPa. Moreover, the compressive elastic modulus is preferably not more than 10000 kPa, more preferably not more than 5000 kPa, and can be not more than 2500 kPa.

The thickness of the polyolefin porous film is not particularly limited, but is preferably 4 μm to 40 μm, and more preferably 5 μm to 20 μm.

The thickness of the polyolefin porous film is preferably not less than 4 μm since an internal short circuit can be sufficiently prevented with such a thickness.

On the other hand, the thickness of the polyolefin porous film is preferably not more than 40 μm since an increase in size of a nonaqueous electrolyte secondary battery can be prevented with such a thickness.

The polyolefin porous film typically has a weight per unit area of preferably 4 g/m$^2$ to 20 g/m$^2$, and more preferably 5 g/m$^2$ to 12 g/m$^2$, so as to allow a nonaqueous electrolyte secondary battery to have a higher weight energy density and a higher volume energy density.

The polyolefin porous film has an air permeability of preferably 30 sec/100 mL to 500 sec/100 mL, and more preferably 50 sec/100 mL to 300 sec/100 mL, in terms of Gurley values, since a sufficient ion permeability is exhibited with such an air permeability.

The polyolefin porous film has a porosity of preferably 20% by volume to 80% by volume, and more preferably 30% by volume to 75% by volume, so as to (i) retain a larger amount of electrolyte and (ii) obtain the function of reliably preventing (shutting down) a flow of an excessively large electric current at a lower temperature.

The polyolefin porous film has a pore diameter of preferably not more than 0.3 μm and more preferably not more than 0.14 μm, in view of sufficient ion permeability and of preventing particles which constitute an electrode from entering the polyolefin porous film.

The nonaqueous electrolyte secondary battery separator in accordance with an embodiment of the present invention may include a porous layer as needed, in addition to the polyolefin porous film. Examples of the porous layer encompass an insulating porous layer constituting the nonaqueous electrolyte laminated separator (described later) and, as other porous layers, publicly known porous layers such as a heat-resistant layer, an adhesive layer, and a protective layer.

[Method of Producing Polyolefin Porous Film]

Examples of a method of producing the polyolefin porous film include, but are not particularly limited to, a method in which a polyolefin-based resin and an additive are melt-kneaded and then extruded to obtain a polyolefin resin composition, and the polyolefin resin composition thus obtained is subjected to stretching, cleaning, and drying.

Specifically, the method can be a method including the following steps of:

(A) melt-kneading a polyolefin-based resin and an additive in a kneader to obtain a polyolefin resin composition;

(B) extruding, through a T-die of an extruder, the melted polyolefin resin composition having been obtained in the step (A), and then shaping the melted polyolefin resin composition into a sheet while cooling the melted polyolefin resin composition, so that a sheet-shaped polyolefin resin composition is obtained;

(C) stretching the sheet-shaped polyolefin resin composition having been obtained in the step (B);

(D) cleaning, with use of a cleaning liquid, the polyolefin resin composition having been stretched in the step (C); and (E) drying and/or heat fixing the polyolefin resin composition having been cleaned in the step (D), so that a polyolefin porous film is obtained.

In the step (A), the polyolefin-based resin is used in an amount of preferably 6% by weight to 45% by weight, and more preferably 9% by weight to 36% by weight, with respect to 100% by weight of the polyolefin resin composition to be obtained.

Examples of the additive in the step (A) include: phthalate esters such as dioctyl phthalate; unsaturated higher alcohol such as oleyl alcohol; saturated higher alcohol such as stearyl alcohol; low molecular weight polyolefin-based resin such as paraffin wax; petroleum resin; and liquid paraffin. Examples of the petroleum resin include: (i) an aliphatic hydrocarbon resin obtained through polymerization of a C5 petroleum fraction such as isoprene, pentene, and pentadiene as a main material; (ii) an aromatic hydrocarbon resin obtained through polymerization of a C9 petroleum fraction such as indene, vinyltoluene, and methyl styrene as a main material; (iii) copolymer resins of the aliphatic hydrocarbon resin and the aromatic hydrocarbon resin; (iv) alicyclic saturated hydrocarbon resins obtained through hydrogenation of the resins (i) to (iii); and (v) varying mixtures of the resins (i) to (iv). The petroleum resin is preferably an alicyclic saturated hydrocarbon resin.

Among those, as the additive, a pore forming agent such as liquid paraffin is preferably used.

In a case where a petroleum resin is used as the additive, in particular, it is more likely that an amount of the extra-fine resin part inside the obtained polyolefin porous film can be caused to fall within a suitable range. Consequently, the measurement-based porosity difference of the nonaqueous electrolyte secondary battery separator that includes the polyolefin porous film can be controlled to a suitable range.

In cooling in the step (B), it is possible to use, for example, a method in which the polyolefin resin composition is put in contact with a cooling medium such as cool air, cooling water, or the like, or a method in which the polyolefin resin composition is put in contact with a cooling roller. Preferably, the method is employed in which the polyolefin resin composition is put in contact with a cooling roller. By the cooling, a microphase of the polyolefin-based resin is fixed. In a case where a cooling rate in the cooling is lowered, a microphase structure tends to become rough. Meanwhile, in a case where the cooling rate is heightened, the microphase structure tends to become minute. That is, as the cooling rate increases, an amount of an extra-fine resin part included in a later obtained polyolefin porous film tends to become larger. A temperature of a cooling roller that can be used in the cooling is preferably not lower than 0° C. and not higher than 60° C., more preferably not lower than 20° C. and not higher than 60° C. A circumferential velocity of the cooling roller is preferably not lower than 0.1 m/min and not higher than 30 m/min, more preferably not lower than 0.5 m/min and not higher than 10 m/min. By carrying out the cooling under conditions falling within the above ranges, a degree of crystallinity of the obtained polyolefin-based resin does not rise, and it is more likely that a sheet-shaped polyolefin resin composition that is suitable for stretching can be obtained.

In the step (C), it is possible to use a commercially-available stretching apparatus for stretching the sheet-shaped polyolefin resin composition. The temperature of the sheet-shaped polyolefin resin composition in stretching is not higher than a crystalline melting point of the polyolefin-based resin, and is preferably not lower than 80° C. and not higher than 125° C., more preferably not lower than 100° C. and not higher than 120° C.

The sheet may be stretched in only the MD or TD or in both of the MD and the TD. Examples of method of stretching the sheet in both of the MD and the TD encompass: sequential biaxial stretching in which the sheet is first stretched in the MD and then stretched in the TD; and simultaneous biaxial stretching in which the sheet is simultaneously stretched in the MD and the TD.

Note that a "machine direction (MD) of a polyolefin porous film" as used herein means a transferring direction in which a polyolefin porous film is transferred during production of the polyolefin porous film. Note also that a "transverse direction (TD) of a polyolefin porous film" as used herein means a direction orthogonal to the MD of a polyolefin porous film.

In the stretching, the sheet-shaped polyolefin resin composition may be stretched by (i) a method in which chucks hold both sides of the sheet and the sheet is drawn, (ii) a method in which rollers for transferring the sheet are set at different rotation speeds so as to draw the sheet, or (iii) a method in which the sheet is rolled by using a pair of rollers.

The following description will discuss detailed conditions for carrying out sequential biaxial stretching in the step (C). A stretch magnification in stretching the sheet-shaped polyolefin resin composition in the MD is preferably not less than 3.0 times and not more than 7.0 times, more preferably not less than 4.5 times and not more than 6.5 times. Further, a strain rate in the MD is preferably not less than 750%/min and not more than 1500%/min, more preferably not less than 800%/min and not more than 1500%/min.

In the step (C), a stretch magnification in further stretching the polyolefin resin composition, which has been stretched in the MD, in the TD is preferably not less than 3.0 times and not more than 7.0 times, more preferably not less than 4.5 times and not more than 6.5 times. In the stretching, a strain rate in the TD is preferably not less than 550%/min and not more than 3000%/min, more preferably not less than 600%/min and not more than 2000%/min.

In a case where the polyolefin resin composition is stretched at a temperature not higher than the crystalline melting point of the polyolefin-based resin, resin in an amorphous portion is cleaved or molecular chains of the resin are stretched, and thus voids are generated. In a case where the strain rate in stretching is lowered, big voids are sparsely generated, a resin part becomes thicker, and an amount of extra-fine resin part tends to become smaller. Meanwhile, in a case where a strain rate in stretching is heightened, fine voids and an amount of extra-fine resin part tend to increase.

A difference in strain rate between the MD and the TD in the stretching is preferably not more than 1250%/min, more preferably not more than 1000%/min. In a case where the difference in strain rate between the MD and the TD is greater than the above ranges, the resin is more oriented in a direction in which the strain rate is higher and therefore the resin part becomes thicker, and this tends to reduce an amount of an extra-fine resin part.

A cleaning liquid used in the step (D) is not limited to a particular one, provided that the cleaning liquid is a solvent that can remove an additive such as a pore forming agent. For example, the cleaning liquid can be heptane or dichloromethane.

Embodiment 2: Nonaqueous Electrolyte Secondary Battery Laminated Separator

A nonaqueous electrolyte secondary battery laminated separator in accordance with Embodiment 2 of the present invention includes (i) a nonaqueous electrolyte secondary battery separator in accordance with Embodiment 1 of the present invention and (ii) an insulating porous layer. Accordingly, the nonaqueous electrolyte secondary battery laminated separator in accordance with Embodiment 2 of the present invention includes a polyolefin porous film constituting the above-described nonaqueous electrolyte secondary battery separator in accordance with Embodiment 1 of the present invention.

[Insulating Porous Layer]

The insulating porous layer constituting the nonaqueous electrolyte secondary battery laminated separator in accordance with an embodiment of the present invention is typically a resin layer containing a resin. This insulating porous layer is preferably a heat-resistant layer or an adhesive layer. The insulating porous layer (hereinafter also simply referred to as "porous layer") preferably contains a resin that is insoluble in a nonaqueous electrolyte of a battery and that is electrochemically stable when the battery is in normal use.

The porous layer is provided on one surface or both surfaces of the nonaqueous electrolyte secondary battery separator as needed. In a case where the porous layer is provided on one surface of the polyolefin porous film, the porous layer is preferably provided on that surface of the polyolefin porous film which surface faces a positive electrode of a nonaqueous electrolyte secondary battery to be produced, more preferably on that surface of the polyolefin porous film which surface comes into contact with the positive electrode.

Examples of the resin constituting the porous layer encompass polyolefins; (meth)acrylate-based resins; fluorine-containing resins; polyamide-based resins; polyester-based resins; polyimide-based resins; rubbers; resins with a melting point or glass transition temperature of not lower than 180° C.; and water-soluble polymers.

Among the above resins, polyolefins, acrylate-based resins, fluorine-containing resins, polyamide-based resins, polyester-based resins and water-soluble polymers are preferable. As the polyamide-based resins, wholly aromatic polyamides (aramid resins) are preferable. As the polyester-based resins, polyarylates and liquid crystal polyesters are preferable.

The porous layer may contain fine particles. The term "fine particles" herein means organic fine particles or inorganic fine particles generally referred to as a filler. Therefore, in a case where the porous layer contains fine particles, the above resin contained in the porous layer has a function as a binder resin for binding (i) fine particles together and (ii) fine particles and the porous film. The fine particles are preferably electrically insulating fine particles.

Examples of the organic fine particles contained in the porous layer encompass resin fine particles.

Specific examples of the inorganic fine particles contained in the porous layer encompass fillers made of inorganic matters such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, and glass. These inorganic fine particles are electrically insulating fine particles. The porous layer may contain only one kind of the fine particles or two or more kinds of the fine particles in combination.

Among the above fine particles, fine particles made of an inorganic matter is suitable. Fine particles made of an inorganic oxide such as silica, calcium oxide, magnesium oxide, titanium oxide, alumina, mica, zeolite, aluminum hydroxide, or boehmite are preferable. Further, fine particles made of at least one kind selected from the group consisting of silica, magnesium oxide, titanium oxide, aluminum hydroxide, boehmite, and alumina are more preferable. Fine particles made of alumina are particularly preferable.

A fine particle content of the porous layer is preferably 1% by volume to 99% by volume, and more preferably 5% by volume to 95% by volume, with respect to 100% by volume of the porous layer. In a case where the fine particle content falls within the above range, it is less likely for a void, which is formed when fine particles come into contact with each other, to be blocked by a resin or the like. This makes it possible to achieve sufficient ion permeability and a proper weight per unit area of the porous film.

The porous layer may include a combination of two or more kinds of fine particles which differ from each other in particle or specific surface area.

A thickness of the porous layer is preferably 0.5 μm to 15 μm (per single porous layer), and more preferably 2 μm to 10 μm (per single porous layer).

If the thickness of the porous layer is less than 1 μm, it may not be possible to sufficiently prevent an internal short circuit caused by breakage or the like of a battery. In addition, an amount of electrolyte solution to be retained by the porous layer may decrease. In contrast, if a total thickness of porous layers on both surfaces of the nonaqueous electrolyte secondary battery separator is above 30 μm, then a rate characteristic or a cycle characteristic may deteriorate.

The weight per unit area of the porous layer (per single porous layer) is preferably 1 g/m$^2$ to 20 g/m$^2$, and more preferably 4 g/m$^2$ to 10 g/m$^2$.

A volume per square meter of a porous layer constituent component contained in the porous layer (per single porous layer) is preferably 0.5 cm$^3$ to 20 cm$^3$, more preferably 1 cm$^3$ to 10 cm$^3$, and still more preferably 2 cm$^3$ to 7 cm$^3$.

For the purpose of obtaining sufficient ion permeability, a porosity of the porous layer is preferably 20% by volume to 90% by volume, and more preferably 30% by volume to 80% by volume. In order for a nonaqueous electrolyte secondary battery laminated separator to obtain sufficient ion permeability, a pore diameter of each of pores of the porous layer is preferably not more than 3 μm, and more preferably not more than 1 μm.

[Laminated Body]

A laminated body which is the nonaqueous electrolyte secondary battery laminated separator in accordance with Embodiment 2 of the present invention includes a nonaqueous electrolyte secondary battery separator in accordance with an embodiment of the present invention and an insulating porous layer. The laminated body is preferably arranged such that the above-described insulating porous layer is provided on one surface or both surfaces of the nonaqueous electrolyte secondary battery separator in accordance with an embodiment of the present invention.

The laminated body in accordance with an embodiment of the present invention has a thickness of preferably 5.5 μm to 45 μm, and more preferably 6 μm to 25 μm.

The laminated body in accordance with an embodiment of the present invention has an air permeability of preferably 30 sec/100 mL to 1000 sec/100 mL, and more preferably 50 sec/100 mL to 800 sec/100 mL, in terms of Gurley values.

The laminated body in accordance with an embodiment of the present invention may include, in addition to the polyolefin porous film and the insulating porous layer which are described above, a publicly known porous film(s) (porous layer(s)) such as a heat-resistant layer, an adhesive layer, and a protective layer according to need as long as such a porous film does not prevent an object of an embodiment of the present invention from being attained.

The laminated body in accordance with an embodiment of the present invention includes, as a base material, a nonaqueous electrolyte secondary battery separator having a measurement-based porosity difference per unit film thickness within a specific range. Therefore, it is possible to inhibit a decline in rate characteristic after a nonaqueous electrolyte secondary battery including the laminated body as a nonaqueous electrolyte secondary battery laminated separator is repeatedly subjected to a charge-discharge cycle. This accordingly makes it possible to enhance a cycle characteristic of the nonaqueous electrolyte secondary battery.

[Method of Producing Porous Layer and Method of Producing Laminated Body]

The insulating porous layer in accordance with an embodiment of the present invention and the laminated body in accordance with an embodiment of the present invention can be each produced by, for example, applying a coating solution (described later) to a surface of the polyolefin porous film of the nonaqueous electrolyte secondary battery separator in accordance with an embodiment of the present invention and then drying the coating solution so as to deposit the insulating porous layer.

Prior to applying the coating solution to a surface of the polyolefin porous film of the nonaqueous electrolyte secondary battery separator in accordance with an embodiment of the present invention, the surface to which the coating solution is to be applied can be subjected to a hydrophilization treatment as needed.

The coating solution for use in a method of producing the porous layer in accordance with an embodiment of the present invention and a method of producing the laminated body in accordance with an embodiment of the present invention can be prepared typically by (i) dissolving, in a solvent, a resin that may be contained in the porous layer described above and (ii) dispersing, in the solvent, fine particles that may be contained in the porous layer described above. The solvent in which the resin is to be dissolved here also serves as a dispersion medium in which the fine particles are to be dispersed. Depending on the solvent, the resin may be an emulsion.

The solvent (dispersion medium) is not limited to any particular one, provided that (i) the solvent does not have an adverse effect on the polyolefin porous film, (ii) the solvent allows the resin to be uniformly and stably dissolved in the solvent, and (iii) the solvent allows the fine particles to be uniformly and stably dispersed in the solvent. Specific examples of the solvent (dispersion medium) encompass water and organic solvents. Only one of these solvents can be used, or two or more of these solvents can be used in combination.

The coating solution may be formed by any method, provided that the coating solution can meet conditions, such as a resin solid content (resin concentration) and a fine particle amount, which are necessary for obtaining a desired porous layer. Specific examples of the method of forming the coating solution encompass a mechanical stirring method, an ultrasonic dispersion method, a high-pressure dispersion method, and a media dispersion method. Further, the coating solution may contain, as a component(s) other than the resin and the fine particles, an additive(s) such as a disperser, a plasticizer, a surfactant, and/or a pH adjustor, provided that the additive does not prevent the object of an embodiment of the present invention from being attained. Note that the additive may be contained in an amount that does not prevent the object of an embodiment of the present invention from being attained.

A method of applying the coating solution to the polyolefin porous film, that is, a method of forming a porous layer on a surface of the polyolefin porous film is not limited to any particular one. The porous layer can be formed by, for example, (i) a method including the steps of applying the coating solution directly to a surface of the polyolefin porous film and then removing the solvent (dispersion medium); (ii) a method including the steps of applying the coating solution to an appropriate support, removing the solvent (dispersion medium) for formation of a porous layer, then pressure-bonding the porous layer to the polyolefin porous film, and subsequently peeling the support off; and (iii) a method including the steps of applying the coating solution to a surface of an appropriate support, then pressure-bonding the polyolefin porous film to that surface, then peeling the support off, and subsequently removing the solvent (dispersion medium).

The coating solution can be applied by a conventionally publicly known method. Specific examples of such a method include a gravure coater method, a dip coater method, a bar coater method, and a die coater method.

The solvent (dispersion medium) is generally removed by a drying method. The solvent (dispersion medium) contained in the coating solution may be replaced with another solvent before a drying operation.

Embodiment 3: Nonaqueous Electrolyte Secondary Battery Member, and Embodiment 4: Nonaqueous Electrolyte Secondary Battery A nonaqueous electrolyte secondary battery member in accordance with Embodiment 3 of the present invention is obtained by including a positive electrode, a nonaqueous electrolyte secondary battery separator in accordance with Embodiment 1 of the present invention or a nonaqueous electrolyte secondary battery laminated separator in accordance with Embodiment 2 of the present invention, and a negative electrode, the positive electrode, the nonaqueous electrolyte secondary battery separator or the nonaqueous electrolyte secondary battery laminated separator, and the negative electrode being disposed in this order.

A nonaqueous electrolyte secondary battery in accordance with Embodiment 4 of the present invention includes the nonaqueous electrolyte secondary battery separator in accordance with Embodiment 1 of the present invention or the nonaqueous electrolyte secondary battery laminated separator in accordance with Embodiment 2 of the present invention.

A nonaqueous electrolyte secondary battery in accordance with an embodiment of the present invention can be, for example, a nonaqueous secondary battery that achieves an electromotive force through doping with and dedoping of lithium, and can include a nonaqueous electrolyte secondary battery member including a positive electrode, a nonaqueous electrolyte secondary battery separator in accordance with an embodiment of the present invention, and a negative electrode, the positive electrode, the nonaqueous electrolyte secondary battery separator, and the negative electrode being disposed in this order. Alternatively, the nonaqueous electrolyte secondary battery in accordance with an embodiment of the present invention can be, for example, a nonaqueous secondary battery that achieves an electromotive force through doping with and dedoping of lithium, and can be a lithium-ion secondary battery that includes a nonaqueous electrolyte secondary battery member including a positive electrode, a porous layer, a nonaqueous electrolyte secondary battery separator in accordance with an embodiment of the present invention, and a negative electrode which are disposed in this order, that is, a lithium-ion secondary battery that includes a nonaqueous electrolyte secondary battery member including a positive electrode, a nonaqueous electrolyte secondary battery laminated separator in accordance with an embodiment of the present invention, and a negative electrode which are disposed in this order. Note that constituent elements, other than the nonaqueous electrolyte secondary battery separator, of the nonaqueous electrolyte secondary battery are not limited to those described below.

The nonaqueous electrolyte secondary battery in accordance with an embodiment of the present invention is typically arranged so that a battery element is enclosed in an exterior member, the battery element including (i) a structure in which the negative electrode and the positive electrode face each other via the nonaqueous electrolyte secondary battery separator in accordance with an embodiment of the present invention or the nonaqueous electrolyte secondary battery laminated separator in accordance with an embodiment of the present invention and (ii) an electrolyte with which the structure is impregnated. The nonaqueous electrolyte secondary battery is preferably a secondary battery including a nonaqueous electrolyte, and is particularly preferably a lithium-ion secondary battery. Note that the doping means occlusion, support, adsorption, or insertion, and means a phenomenon in which lithium ions enter an active material of an electrode (e.g., a positive electrode).

Since the nonaqueous electrolyte secondary battery member in accordance with an embodiment of the present invention includes the nonaqueous electrolyte secondary battery separator in accordance with an embodiment of the present invention or the nonaqueous electrolyte secondary battery laminated separator in accordance with an embodiment of the present invention, it is possible to inhibit a decline in rate characteristic after a charge-discharge cycle of a nonaqueous electrolyte secondary battery, into which the nonaqueous electrolyte secondary battery member is incorporated, is repeated. Since the nonaqueous electrolyte secondary battery in accordance with an embodiment of the present invention includes the nonaqueous electrolyte secondary battery separator in accordance with an embodiment of the present invention whose measurement-based porosity difference is adjusted to be within a specific range, the nonaqueous electrolyte secondary battery advantageously has an excellent cycle characteristic.

<Positive Electrode>

A positive electrode included in the nonaqueous electrolyte secondary battery member in accordance with an embodiment of the present invention or in the nonaqueous electrolyte secondary battery in accordance with an embodiment of the present invention is not limited to any particular one, provided that the positive electrode is one that is generally used as a positive electrode of a nonaqueous electrolyte secondary battery. Examples of the positive electrode encompass a positive electrode sheet having a structure in which an active material layer containing a positive electrode active material and a binder resin is formed on a current collector. The active material layer may further contain an electrically conductive agent and/or a binding agent.

The positive electrode active material is, for example, a material capable of being doped with and dedoped of lithium ions. Specific examples of such a material encompass a lithium complex oxide containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound. It is possible to use only one kind of the above electrically conductive agents or two or more kinds of the above electrically conductive agents in combination.

Examples of the binding agent encompass (i) fluorine-based resins such as polyvinylidene fluoride, (ii) acrylic resin, and (iii) styrene butadiene rubber. Note that the binding agent serves also as a thickener.

Examples of the positive electrode current collector encompass electric conductors such as Al, Ni, and stainless steel. Among these, Al is preferable because Al is easily processed into a thin film and is inexpensive.

Examples of a method of producing the positive electrode sheet encompass: a method in which a positive electrode active material, an electrically conductive agent, and a binding agent are pressure-molded on a positive electrode current collector; and a method in which (i) a positive electrode active material, an electrically conductive agent, and a binding agent are formed into a paste with the use of a suitable organic solvent, (ii) then, a positive electrode current collector is coated with the paste, and (iii) subsequently, the paste is dried and then pressured so that the paste is firmly fixed to the positive electrode current collector.

<Negative Electrode>

A negative electrode included in the nonaqueous electrolyte secondary battery member in accordance with an embodiment of the present invention or in the nonaqueous electrolyte secondary battery in accordance with an embodiment of the present invention is not limited to any particular one, provided that the negative electrode is one that is generally used as a negative electrode of a nonaqueous electrolyte secondary battery. Examples of the negative electrode encompass a negative electrode sheet having a structure in which an active material layer containing a negative electrode active material and a binder resin is formed on a current collector. The active material layer may further contain an electrically conductive agent.

Examples of the negative electrode active material encompass (i) a material capable of being doped with and dedoped of lithium ions, (ii) lithium metal, and (iii) lithium alloy. Examples of such a material encompass a carbonaceous material and the like. Examples of a carbonaceous material encompass natural graphite, artificial graphite, cokes, carbon black, pyrolytic carbon, and the like.

Examples of the negative electrode current collector encompass Cu, Ni, and stainless steel. Among these, Cu is more preferable because Cu is not easily alloyed with lithium especially in a lithium-ion secondary battery and is easily processed into a thin film.

Examples of a method of producing the negative electrode sheet encompass: a method in which a negative electrode active material is pressure-molded on a negative electrode current collector; and a method in which (i) a negative electrode active material is formed into a paste with the use of a suitable organic solvent, (ii) then, a negative electrode current collector is coated with the paste, and (iii) subsequently, the paste is dried and then pressured so that the paste is firmly fixed to the negative electrode current collector. The above paste preferably includes the above electrically conductive agent and the binding agent.

<Nonaqueous Electrolyte>

A nonaqueous electrolyte in a nonaqueous electrolyte secondary battery in accordance with an embodiment of the present invention is not limited to any particular one, provided that the nonaqueous electrolyte is one that is generally used for a nonaqueous electrolyte secondary battery. The nonaqueous electrolyte can be one prepared by, for example, dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one kind of the above lithium salts or two or more kinds of the above lithium salts in combination.

Examples of the organic solvent to be contained in the nonaqueous electrolyte encompass carbonates, ethers, esters, nitriles, amides, carbamates, and sulfur-containing compounds, and fluorine-containing organic solvents each obtained by introducing a fluorine group into any of these organic solvents. It is possible to use only one kind of the above organic solvents or two or more kinds of the above organic solvents in combination.

<Method of Producing Nonaqueous Electrolyte Secondary Battery Member and Method of Producing Nonaqueous Electrolyte Secondary Battery>

A nonaqueous electrolyte secondary battery member in accordance with an embodiment of the present invention can be produced by, for example, disposing the positive electrode, the nonaqueous electrolyte secondary battery separator in accordance with an embodiment of the present invention or the nonaqueous electrolyte secondary battery laminated separator in accordance with an embodiment of the present invention, and the negative electrode in this order.

Further, a nonaqueous electrolyte secondary battery in accordance with an embodiment of the present invention can be produced by, for example, (i) forming a nonaqueous electrolyte secondary battery member by the method described above, (ii) placing the nonaqueous electrolyte secondary battery member in a container which is to serve as a housing of the nonaqueous electrolyte secondary battery, (iii) filling the container with a nonaqueous electrolyte, and then (iv) hermetically sealing the container while reducing the pressure inside the container.

EXAMPLES

The following description will discuss embodiments of the present invention in greater detail with reference to Examples and Comparative Examples. Note, however, that the present invention is not limited to the following Examples and Comparative Examples.

[Measurement Method]

<Method of Measuring SEM Porosity>

The following method was used to calculate an SEM porosity of a nonaqueous electrolyte secondary battery separator (polyolefin porous film) produced in each of Examples and Comparative Examples.

First, a polyolefin porous film was impregnated with an embedding resin (such as epoxy resin) so as to fill voids of the polyolefin porous film, and then the embedding resin was cured. After the curing, the polyolefin porous film was processed with osmium tetroxide, and thus a measurement sample was prepared. Then, Pt—Pd was vapor-deposited onto a surface of the measurement sample.

Here, a thickness direction of the measurement sample (a direction in which a thickness of the measurement sample extends) is a Z direction, any direction that is parallel to a surface of the measurement sample which surface is orthogonal to the thickness is an X direction, and a direction that is orthogonal to each of the X direction and the Z direction is a Y direction. A cross section defined by any side X of a surface of the measurement sample and a thickness Z of the measurement sample (hereinafter referred to as an "X-Z cross section") was produced by carrying out FIB processing with respect to the measurement sample by use of an FIB-SEM (HELIOS600 manufactured by FEI). The cross section was subjected to SEM observation (in which a reflection electron image is shown) at an acceleration voltage of 2.1 kV and a magnification of 6500 times, so that an SEM image was obtained.

After the SEM observation, FIB processing was carried out with respect to the measurement sample by a thickness of 19.2 nm in the Y direction, which is orthogonal to the X-Z cross section, so that a new X-Z cross section was produced. The new X-Z cross section was subjected to the SEM observation (in which a reflection electron image is shown) under the above conditions, so that an SEM image was obtained. Thereafter, FIB processing and SEM image obtainment were similarly repeated at intervals of a thickness of 19.2 nm, so that an X-Z cross section continuous image of the measurement sample was obtained.

Subsequently, the X-Z cross section continuous image was positionally corrected by use of image analysis software (Avizo Ver. 6.0 manufactured by Visualization Sciences Group), and the X-Z cross section continuous image thus corrected was obtained. The scale was 19.2 nm/pix in X, Y, and Z-axes.

Quantitative analysis software (TRI/3D-BON-FCS manufactured by Ratoc System Engineering Co., Ltd.) was used to show the X-Z cross section continuous image, which had been positionally corrected, at two gray levels so that a resin part and a void part of the polyolefin porous film can be distinguished.

Specifically, the conversion into the image shown at two gray levels was carried out as follows: that is, first, the X-Z cross section continuous image was opened on TRI/3D-BON-FCS, a median filter was applied so as to remove noises, and then the image was converted into an image shown at two gray levels with use of Auto-LW.

Subsequently, an X-Z plane of the X-Z cross section continuous image in which the resin part and the void part were shown at respective two gray levels was transformed to an X-Y plane by use of SectionView in an EditViewer mode on the TRI/3D-BON-FCS. This allowed the X-Z cross section continuous image to be transformed to a surface direction continuous image (hereinafter referred to as an "X-Y plane continuous image") of the measurement sample which surface direction continuous image was formed so as to extend from a surface to an inside of the measurement sample in a thickness direction of the measurement sample, and which surface direction continuous image was shown at two gray levels. In the X-Y plane continuous image after conversion also, the scale was 19.2 nm/pix in X, Y, and Z-axes.

Thereafter, any part whose number of pixels was 256 pix in the X direction, was 256 pix in the Y direction, and corresponded to a thickness (pix) of the measurement sample in the Z direction was trimmed from the X-Y plane continuous image, so that an analysis continuous image was obtained.

The analysis continuous image was segmented into a plurality of images each of which had a size of 1 pix in the Z direction. For each of the plurality of images, a ratio of the void part (porosity) with respect to an analysis region was measured with use of a 2D label density function. An average porosity (i.e., a porosity of the measurement sample) was calculated from the measured porosities of the respective plurality of images. The porosity of the measurement sample thus calculated is regarded as an "SEM porosity" of the polyolefin porous film.

<Method of Measuring Real Porosity>

The following steps (a) to (d) were used to calculate a real porosity of a nonaqueous electrolyte secondary battery separator (porous film) produced in each of Examples and Comparative Examples.

(a) Measurement of Thickness of Film

A thickness of the porous film was measured with the use of a high-precision digital measuring device (VL-50) manufactured by Mitutoyo Corporation.

(b) Measurement of Weight Per Unit Area

A sample in the form of an 8 cm square was cut out from the porous film, and the weight W(g) of the sample was measured. Then, the weight per unit area of the porous film was calculated in accordance with the following Formula (2):

$$\text{Weight per unit area (g/m}^2\text{)}=W/(0.08\times0.08) \quad (2)$$

(c) Measurement of Real Density

First, the porous film was cut into 4 mm to 6 mm square pieces. Then, after these square pieces were vacuum-dried at a temperature of not higher than 30° C. for 17 hours, a real density of the porous film was measured by a helium gas displacement technique, by using a dry-type automatic densimeter (AccuPye II 1340 manufactured by Micromeritics Instrument Corporation).

(d) Calculation of Real Porosity

A real porosity [%] of the porous film was calculated, by the following Formula (1), from the thickness [μm], the weight per unit area [g/m$^2$] and the real density [g/m$^3$] of the porous film, which were measured and/or calculated in the above steps (a) to (c).

$$(\text{Real porosity})=[1-(\text{weight per unit area})/\{(\text{film thickness})\times 10^{-6}\times 1\ [\text{m}^2]\times(\text{real density})\}]\times 100 \quad (1)$$

<Method of Calculating Measurement-Based Porosity Difference>

A difference between the SEM porosity and the real porosity which had been calculated with the above described methods was calculated, and the difference thus calculated is regarded as a measurement-based porosity difference of a nonaqueous electrolyte secondary battery separator (polyolefin porous film) produced in each of Examples and Comparative Examples.

<Method of Measuring Air Permeability>

An air permeability [sec/100 mL] of the polyolefin porous film produced in each of Examples and Comparative Examples was measured in conformity to JIS P8117.

<Method of Measuring Compressive Elastic Modulus>

The following method was used to measure compressive elastic modulus in the thickness direction of a nonaqueous electrolyte secondary battery separator (polyolefin porous film) produced in each of Examples and Comparative Examples.

With use of TMA/SS7100 (manufactured by SII Nano-Technology Inc.), a degree of strain was measured with respect to a stress applied in the thickness direction to a nonaqueous electrolyte secondary battery separator under the following conditions: that is, a temperature of 25° C., a start load of 5 mN, a compression rate of 150.17 mN/min, and a probe area of 0.785 mm$^2$ (probe end diameter of 1.0 mmϕ). Then, the degree of the strain with respect to the stress was plotted, and thus a stress-strain straight line between the strains from 0% to 10% was prepared. From an inclination of the stress-strain straight line, a compressive elastic modulus in the thickness direction was calculated. Note that, in the above measurement of compressive elastic modulus, a position at the start load of 5 mN was considered as having a strain of 0%.

<Method of Measuring Temperature at Which Alicyclic Saturated Hydrocarbon Resin and Liquid Paraffin Are Compatibly Blended>

Alicyclic saturated hydrocarbon resin and liquid paraffin, each of which was in an amount of 1 g, were put into a sampling tube. The sampling tube was heated up on a hot plate, and a temperature of a product, in which the alicyclic saturated hydrocarbon resin and the liquid paraffin were uniformly compatibly blended, inside the sampling tube was measured. The temperature thus measured is considered as a temperature at which alicyclic saturated hydrocarbon resin and liquid paraffin are compatibly blended.

<Method of Measuring Rate Characteristic After 100 Cycles>

The following method was used for measuring a rate characteristic of the nonaqueous electrolyte secondary battery after 100 cycles, which nonaqueous electrolyte secondary battery was produced in each of Examples and Comparative Examples.

A new nonaqueous electrolyte secondary battery (produced in each of Examples and Comparative Examples) which had not been subjected to any charge-discharge cycle was subjected to four cycles of initial charge and discharge. Each of the four cycles of the initial charge and discharge was carried out at 25° C., at a voltage ranging from 4.1 V to 2.7 V, and at an electric current value of 0.2 C (note that 1 C is an electric current value at which a battery rated capacity derived from a one-hour rate discharge capacity is discharged in one hour, and this applies to the following descriptions).

With respect to the nonaqueous electrolyte secondary battery which had been subjected to the initial charge and discharge, charge and discharge were carried out at 55° C., at a constant electric current of a charge electric current value of 1 C and each of discharge electric current values of 0.2 C, 1 C, 5 C, 10 C, 20 C, and 0.2 C in this order. Each of those cycles of charge (at 1 C) and discharge (at 0.2 C, 1 C, 5 C, 10 C, 20 C, or 0.2 C) was carried out three times, and thus an initial rate characteristic was measured.

The nonaqueous electrolyte secondary battery whose initial rate characteristic had been measured was subjected to 100 cycles of charge and discharge. In each of the 100 cycles of charge and discharge, the charge and discharge were carried out at 55° C., in a voltage range from 4.2 V to 2.7 V, and at a constant electric current of a charge electric current value of 1 C and a discharge electric current value of 10 C. With respect to the nonaqueous electrolyte secondary battery which had been subjected to the 100 cycles of charge and discharge, charge and discharge were carried out at 55° C., and at a constant electric current of a charge electric current value of 1 C and each of discharge electric current values of 0.2 C, 1 C, 5 C, 10 C, 20 C, and 0.2 C in this order. Each of those cycles of charge (at 1 C) and discharge (at 0.2 C, 1 C, 5 C, 10 C, 20 C, or 0.2 C) was carried out three times.

A ratio between discharged capacities at the discharge electric current value of 0.2 C (first one) and the discharge electric current value of 20 C (i.e., discharged capacity at 20 C/discharged capacity at 0.2 C) in the third cycle was calculated as a rate characteristic after the 100 cycles.

Example 1

[Production of Nonaqueous Electrolyte Secondary Battery Separator]

First, 18% by weight of ultra-high molecular weight polyethylene powder (HI-ZEX MILLION 145M; manufactured by Mitsui Chemicals, Inc.) and 2% by weight of an alicyclic saturated hydrocarbon resin (softening point: 115° C.), which is compatibly blended with liquid paraffin at 155° C. were prepared. The ultra-high molecular weight polyethylene powder and the alicyclic saturated hydrocarbon resin were crushed and blended with use of a blender until particle sizes thereof became uniform, and then mixed powder thus obtained was fed into a twin screw kneading extruder with use of a quantitative feeder and was then melt-kneaded. When the mixed powder was melt-kneaded, 80% by weight of the liquid paraffin was added under pressure into the twin screw kneading extruder via a pump, and melt-kneaded together with the mixed powder.

Thereafter, a melt-kneaded material thus obtained was extruded through a T-die via a gear pump, so that a polyolefin resin composition was prepared. The polyolefin resin composition was cooled by a cooling roller at 40° C., and as a result, a roll of sheet-shaped polyolefin resin composition was obtained. In that case, a circumferential velocity of the cooling roller was set to 1.3 m/min.

The sheet-shaped polyolefin resin composition thus obtained was stretched at 117° C. in the MD with a stretch magnification of 6.4 times. A strain rate in that case was set to 1000%/min. Subsequently, the sheet-shaped polyolefin resin composition was stretched at 115° C. in the TD with a stretch magnification of 6.0 times. A strain rate in that case was set to 700%/min.

The sheet-shaped polyolefin resin composition which had been stretched was immersed in heptane so as to eliminate the additive, and was then dried by being left still in a ventilation oven at 120° C. for one minute. Thus, a porous film having a film thickness of 19.7 μm and an air permeability of 115 sec/100 mL was obtained. The porous film thus obtained is hereinafter referred to as "polyolefin porous film 1".

[Preparation of Nonaqueous Electrolyte Secondary Battery]

A positive electrode and a negative electrode were prepared with the following methods.

(Preparation of Positive Electrode)

A commercially available positive electrode was used that was produced by applying $LiNi_{0.5}Mn_{0.3}Co_{0.2}O_2$/electrically conductive agent/PVDF (weight ratio 92:5:3) to an aluminum foil. The aluminum foil of the commercially available positive electrode was partially cut off so that a positive electrode active material layer was present in an area of 45 mm×30 mm and that this area with the positive electrode active material layer was surrounded by an area with a width of 13 mm in which area no positive electrode active material layer was present. A portion thus cut from the commercially available positive electrode was used as a positive electrode. The positive electrode active material layer had a thickness of 58 μm and a density of 2.50 g/cm$^3$. The positive electrode had a capacity of 174 mAh/g.

(Preparation of Negative Electrode)

A commercially available negative electrode was used that was produced by applying graphite/styrene-1,3-butadiene copolymer/sodium carboxymethylcellulose (weight ratio 98:1:1) to a copper foil. The copper foil of the commercially available negative electrode was partially cut off so that a negative electrode active material layer was present in an area of 50 mm×35 mm and that this area with the negative electrode active material layer was surrounded by an area with a width of 13 mm in which area no negative electrode active material layer was present. A portion thus cut from the commercially available negative electrode was used as a negative electrode. The negative electrode active material layer had a thickness of 49 μm and a density of 1.40 g/cm$^3$. The negative electrode had a capacity of 372 mAh/g.

(Assembly of Nonaqueous Electrolyte Secondary Battery)

The following method was used for preparing a nonaqueous electrolyte secondary battery by using the positive electrode, the negative electrode, and the polyolefin porous film 1.

In a laminate pouch, the positive electrode, the polyolefin porous film 1 as the nonaqueous electrolyte secondary battery separator, and the negative electrode were disposed (arranged to form a laminate) in this order so as to obtain a nonaqueous electrolyte secondary battery member. During this operation, the positive electrode and the negative electrode were arranged so that the positive electrode active material layer of the positive electrode had a main surface that was entirely covered by the main surface of the negative electrode active material layer of the negative electrode.

Subsequently, the nonaqueous electrolyte secondary battery member was put into a bag made of a laminate of an aluminum layer and a heat seal layer. Further, 0.25 mL of nonaqueous electrolyte was put into the bag. The nonaqueous electrolyte was a nonaqueous electrolyte at 25° C. prepared by dissolving $LiPF_6$ in a mixed solvent of ethyl methyl carbonate, diethyl carbonate, and ethylene carbonate in a volume ratio of 50:20:30 so that a concentration of the $LiPF_6$ becomes 1.0 mole per liter. The bag was then heat-sealed while the pressure inside the bag was reduced. This produced a nonaqueous secondary battery. The nonaqueous secondary battery had a design capacity of 20.5 mAh. The nonaqueous electrolyte secondary battery thus obtained is hereinafter referred to as "nonaqueous electrolyte secondary battery 1".

Example 2

[Preparation of Porous Film]

First, 18% by weight of ultra-high molecular weight polyethylene powder (HI-ZEX MILLION 145M; manufactured by Mitsui Chemicals, Inc.) and 2% by weight of an alicyclic saturated hydrocarbon resin (softening point: 90° C.), which is compatibly blended with liquid paraffin at 130° C. were prepared. The ultra-high molecular weight polyethylene powder and the alicyclic saturated hydrocarbon resin were crushed and blended with use of a blender until particle sizes thereof became uniform, and then mixed powder thus obtained was fed into a twin screw kneading extruder with use of a quantitative feeder and was then melt-kneaded. When the mixed powder was melt-kneaded, 80% by weight of the liquid paraffin was added under pressure into the twin screw kneading extruder via a pump, and melt-kneaded together with the mixed powder.

Thereafter, a melt-kneaded material thus obtained was extruded through a T-die via a gear pump, so that a polyolefin resin composition was prepared. The polyolefin resin composition was cooled by a cooling roller at 40° C., and as a result, a roll of sheet-shaped polyolefin resin composition was obtained. In that case, a circumferential velocity of the cooling roller was set to 1.3 m/min.

The sheet-shaped polyolefin resin composition thus obtained was stretched at 117° C. in the MD with a stretch magnification of 6.4 times. A strain rate in that case was set to 1000%/min. Subsequently, the sheet-shaped polyolefin resin composition was stretched at 115° C. in the TD with a stretch magnification of 6.0 times. A strain rate in that case was set to 700%/min.

The sheet-shaped polyolefin resin composition which had been stretched was immersed in heptane so as to eliminate the additive, and was then dried by being left still in a ventilation oven at 135° C. for 12 minutes. Thus, a porous film having a film thickness of 10.0 μm and an air permeability of 137 sec/100 mL was obtained. The porous film thus obtained is hereinafter referred to as "polyolefin porous film 2".

[Preparation of Nonaqueous Electrolyte Secondary Battery]

A nonaqueous electrolyte secondary battery was prepared in a manner similar to that of Example 1, except that the polyolefin porous film 2 was used instead of the polyolefin porous film 1. The nonaqueous electrolyte secondary battery thus prepared is hereinafter referred to as "nonaqueous electrolyte secondary battery 2".

Comparative Example 1

[Preparation of Porous Film]

First, 68% by weight of ultra-high molecular weight polyethylene powder (GUR2024, available from Ticona Corporation) and 32% by weight of polyethylene wax (FNP-0115; available from Nippon Seiro Co., Ltd.) having a weight-average molecular weight of 1000 were prepared, that is, 100 parts by weight in total of the ultra-high molecular weight polyethylene and the polyethylene wax were prepared. Then, 0.4% by weight of an antioxidant (Irg1010, available from Ciba Specialty Chemicals), 0.1% by weight of an antioxidant (P168, available from Ciba Specialty Chemicals), and 1.3% by weight of sodium stearate were added to the ultra-high molecular weight polyethylene and the polyethylene wax, and then calcium carbonate (available from Maruo Calcium Co., Ltd.) having an average particle size of 0.1 μm was further added by 38% by volume with respect to the total volume of the above ingredients. Then, the ingredients were mixed in powder form with use of a Henschel mixer, and were then melt-kneaded with use of a twin screw kneading extruder. This produced a polyolefin resin composition. The polyolefin resin composition was cooled down and stretched at a strain rate of 150%/min with use of a roller, and thus a sheet was prepared. This sheet was immersed in an aqueous hydrochloric acid solution (containing 4 mol/L of hydrochloric acid and 0.5% by weight of nonionic surfactant) for removal of the calcium carbonate, and was then stretched with a stretch magnification of 6.2 times at 105° C. at a strain rate of 1250%/min. This prepared a porous film having a thickness of 10.4 μm and an air permeability of 209 sec/100 mL. The porous film thus obtained is hereinafter referred to as "polyolefin porous film 3".

[Preparation of Nonaqueous Electrolyte Secondary Battery]

A nonaqueous electrolyte secondary battery was prepared in a manner similar to that of Example 1, except that the polyolefin porous film 3 was used instead of the polyolefin porous film 1. The nonaqueous electrolyte secondary battery thus prepared is hereinafter referred to as "nonaqueous electrolyte secondary battery 3".

Comparative Example 2

[Preparation of Porous Film]

First, 18% by weight of ultra-high molecular weight polyethylene powder (HI-ZEX MILLION 145M; manufactured by Mitsui Chemicals, Inc.) and 2% by weight of an alicyclic saturated hydrocarbon resin (softening point: 125° C.), which is compatibly blended with liquid paraffin at 164° C. were prepared. The ultra-high molecular weight polyethylene powder and the alicyclic saturated hydrocarbon resin were crushed and blended with use of a blender until particle sizes thereof became uniform, and then mixed powder thus obtained was fed into a twin screw kneading extruder with use of a quantitative feeder and was then melt-kneaded. When the mixed powder was melt-kneaded, 80% by weight of the liquid paraffin was added under pressure into the twin screw kneading extruder via a pump, and melt-kneaded together with the mixed powder.

Thereafter, a melt-kneaded material thus obtained was extruded through a T-die via a gear pump, so that a polyolefin resin composition was prepared. The polyolefin resin composition was cooled by a cooling roller at 40° C., and as a result, a roll of sheet-shaped polyolefin resin composition was obtained. In that case, a circumferential velocity of the cooling roller was set to 1.3 m/min.

The sheet-shaped polyolefin resin composition thus obtained was stretched at 117° C. in the MD with a stretch magnification of 6.4 times. A strain rate in that case was set to 700%/min. Subsequently, the sheet-shaped polyolefin resin composition was stretched at 115° C. in the TD with a stretch magnification of 6.0 times. A strain rate in that case was set to 500%/min.

The sheet-shaped polyolefin resin composition which had been stretched was immersed in heptane so as to eliminate the additive, and was then dried by being left still in a ventilation oven at 120° C. for one minute. Thus, a porous film having a film thickness of 19.1 μm and an air permeability of 112 sec/100 mL was obtained. The porous film thus obtained is hereinafter referred to as "polyolefin porous film 4".

[Preparation of Nonaqueous Electrolyte Secondary Battery]

A nonaqueous electrolyte secondary battery was prepared in a manner similar to that of Example 1, except that the polyolefin porous film 4 was used instead of the polyolefin porous film 1. The nonaqueous electrolyte secondary battery thus prepared is hereinafter referred to as "nonaqueous electrolyte secondary battery 4".

[Conclusion]

Table 1 below shows values of the "SEM porosity", the "real porosity", the "measurement-based porosity difference", and the "compressive elastic modulus" of each of the polyolefin porous films 1 through 4 produced in Examples 1 and 2 and Comparative Examples 1 and 2, respectively, and values of the "rate characteristic after 100 charge-discharge cycles" of each of the nonaqueous electrolyte secondary batteries 1 through 4 produced in Examples 1 and 2 and Comparative Examples 1 and 2, respectively.

TABLE 1

| | SEM porosity [%] | Real porosity [%] | Measurement-based porosity difference [%] | Compressive elastic modulus [kPa] | Rate characteristic after 100 cycles [%] |
|---|---|---|---|---|---|
| Example 1 | 64.8 | 60.0 | 4.8 | 2487 | 74 |
| Example 2 | 53.5 | 34.8 | 18.7 | 2368 | 60 |
| Comparative Example 1 | 39.9 | 37.0 | 2.9 | 1577 | 37 |
| Comparative Example 2 | 62.9 | 59.5 | 3.4 | 1142 | 32 |

[Conclusion]

From the results shown in Table 1, it was found that the nonaqueous electrolyte secondary battery including the nonaqueous electrolyte secondary battery separator (polyolefin porous film), which was produced in each of Examples 1 and 2 and had a measurement-based porosity difference in a range of 4% to 20%, had a higher rate characteristic after 100 charge-discharge cycles, as compared to the nonaqueous electrolyte secondary battery including the nonaqueous electrolyte secondary battery separator, which was produced in each of Comparative Examples 1 and 2 and had a measurement-based porosity difference outside the above range, and accordingly, the nonaqueous electrolyte secondary battery including the nonaqueous electrolyte secondary battery separator produced in each of Examples 1 and 2 was superior in cycle characteristic to the nonaqueous electrolyte secondary battery including the nonaqueous electrolyte secondary battery separator produced in each of Comparative Examples 1 and 2.

INDUSTRIAL APPLICABILITY

A nonaqueous electrolyte secondary battery separator in accordance with an embodiment of the present invention is excellent in cycle characteristic. Therefore, the nonaqueous electrolyte secondary battery separator in accordance with an embodiment of the present invention is useful as a member for a nonaqueous electrolyte secondary battery.

The invention claimed is:

1. A nonaqueous electrolyte secondary battery member comprising:
a positive electrode;
a nonaqueous electrolyte secondary battery separator; and
a negative electrode,
the positive electrode, the nonaqueous electrolyte secondary battery separator, and the negative electrode being disposed in this order,
the nonaqueous electrolyte secondary battery separator including a polyolefin porous film, wherein:
the porous film has a real porosity calculated by the following Formula (1) using a thickness (μm), a weight per unit area (g/m$^2$), and a real density (g/m$^3$) of the polyolefin porous film:

(Real porosity)=[1−(weight per unit area)/{(film thickness)×10$^{-6}$×1[m$^2$]×(real density)}]×100     (1)

the porous film has a continuous image obtained from an FIB-SEM measurement with a magnification of 6500 times and image analysis, the continuous image having a size of 256 pix×256 pix along a surface of the nonaqueous electrolyte secondary battery separator where 1 pix is 19.2 nm, a thickness of the continuous image being equal to a thickness of the nonaqueous electrolyte secondary battery separator, wherein the continuous image extends from the surface to an inside of the nonaqueous electrolyte secondary battery separator in a thickness direction, and, in the continuous image, a void part and a resin part of the polyolefin porous film are shown at two gray levels, wherein the continuous image is segmented into a plurality of images,
the porous film has an average porosity calculated from the plurality of images; and
wherein a difference between the real porosity and the average porosity is 4% to 20%,
wherein the porous film has a weight per unit area of 4 g/m$^2$ to 20 g/m$^2$.

2. The nonaqueous electrolyte secondary battery separator member as set forth in claim 1, wherein a compressive elastic modulus of said nonaqueous electrolyte secondary battery separator is not less than 1600 kPa.

3. A nonaqueous electrolyte secondary battery member comprising:
a positive electrode;
a nonaqueous electrolyte secondary battery laminated separator; and
a negative electrode,
the positive electrode, the nonaqueous electrolyte secondary battery laminated separator, and the negative electrode being disposed in this order,
the nonaqueous electrolyte secondary battery laminated separator comprising:
a nonaqueous electrolyte secondary battery separator and an insulating porous layer,
the nonaqueous electrolyte secondary battery separator including a polyolefin porous film, wherein:
the porous film has a real porosity calculated by the following Formula (1) using a thickness (μm), a weight per unit area (g/m$^2$), and a real density (g/m$^3$) of the polyolefin porous film:

(Real porosity)=[1−(weight per unit area)/{(film thickness)×10$^{-6}$×1[m$^2$]×(real density)}]×100     (1), the porous film has a continuous image obtained from an FIB-SEM measurement with a magnification of 6500 times and image analysis, the continuous image having a size of 256 pix×256 pix along a surface of the nonaqueous electrolyte secondary battery separator where 1 pix is 19.2 nm, a thickness of the continuous image being equal to a thickness of the nonaqueous electrolyte secondary battery separator, wherein the continuous image extends from the surface to an inside of the nonaqueous electrolyte secondary battery separator in a thickness direction, and, in the continuous image, a void part and a resin part of the polyolefin porous film are shown at two gray levels, wherein the continuous image is segmented into a plurality of images,
the porous film has an average porosity calculated from the plurality of images; and
wherein a difference between the real porosity and the average porosity is 4% to 20%,
wherein the porous film has a weight per unit area of 4 g/m$^2$ to 20 g/m$^2$.

4. A nonaqueous electrolyte secondary battery member as set forth in claim 3, wherein:
the insulating porous layer contains a polyamide-based resin.

* * * * *